UNITED STATES PATENT OFFICE.

HENRY LOEWENBERG, OF BOSTON, MASSACHUSETTS.

IMPROVED COMPOSITION FOR MANUFACTURE OF MOLDINGS AND OTHER PURPOSES.

Specification forming part of Letters Patent No. 34,757, dated March 25, 1862.

*To all whom it may concern:*

Be it known that I, HENRY LOEWENBERG, a native of the Kingdom of Prussia, but a resident of Boston, in the county of Suffolk and State of Massachusetts, have invented a new and useful composition to be used for the manufacture of moldings, ornamental work, or various other articles; and I do hereby declare the same to be described as follows:

The said component parts of the said composition and their proportions are as follows, viz: sawdust or comminuted wood, four or five parts, by measure; starch, one measure. These are to be mixed or put together in a kettle or vessel, into which steam is afterward to be introduced in such manner as to cause it to perforate and spread through the entire mass, until by steaming and stirring the sawdust and starch may have been thoroughly mixed together, and the whole brought to the consistence of a soft yielding paste or dough. Should it be desirable to have this dough when dry very hard, there may be mixed with it during the process of stirring and steaming the component parts above recited a small portion of common caustic potash, which, for its better incorporation, may be first dissolved in a little water. The proportion of the potash to the dough may be three ounces of the former to a cubic foot of the latter.

The dough or composition may be colored by the admixture of mineral or vegetable colors or substances, which may be introduced into it while being prepared by steam, as described.

I do not employ with sawdust an animal element—such as glue or albumen—because they will not combine as sawdust combines with a vegetable matter such as starch, there being in the sawdust more or less starch, or what will so readily combine with the starch, as to cause the paste when dry to have much flexibility, whereas compositions of sawdust and either animal glue or gum-shellac or other vegetable gum will be very brittle when dry, and can be readily broken in comparison to my improved composition, which, owing to its great flexibility, is calculated for molding very fine ornaments, or for having very fine work cut in or carved from it.

I do not claim a mixture of sawdust and either gum-shellac, albumen, or an animal glue or cement; nor do I claim the mixing of sawdust with any other material by means of water alone, as in making my composition steam becomes a matter of necessity in order to produce the proper softening or preparation of the wood and the starch, and their combination with each other.

What I claim as my invention is—

1. A composition made by combining starch and sawdust or comminuted wood by steam and by stirring them while under the influence of steam, so as to reduce them to a paste or dough capable of being molded and dried and becoming flexible when dry.

2. The combination of potash or an alkaline equivalent with the composition of starch and sawdust while being treated as described, the same being for the purpose as above specified.

HENRY LOEWENBERG.

Witnesses:
R. H. EDDY,
F. P. HALE, Jr.